Figure 1:
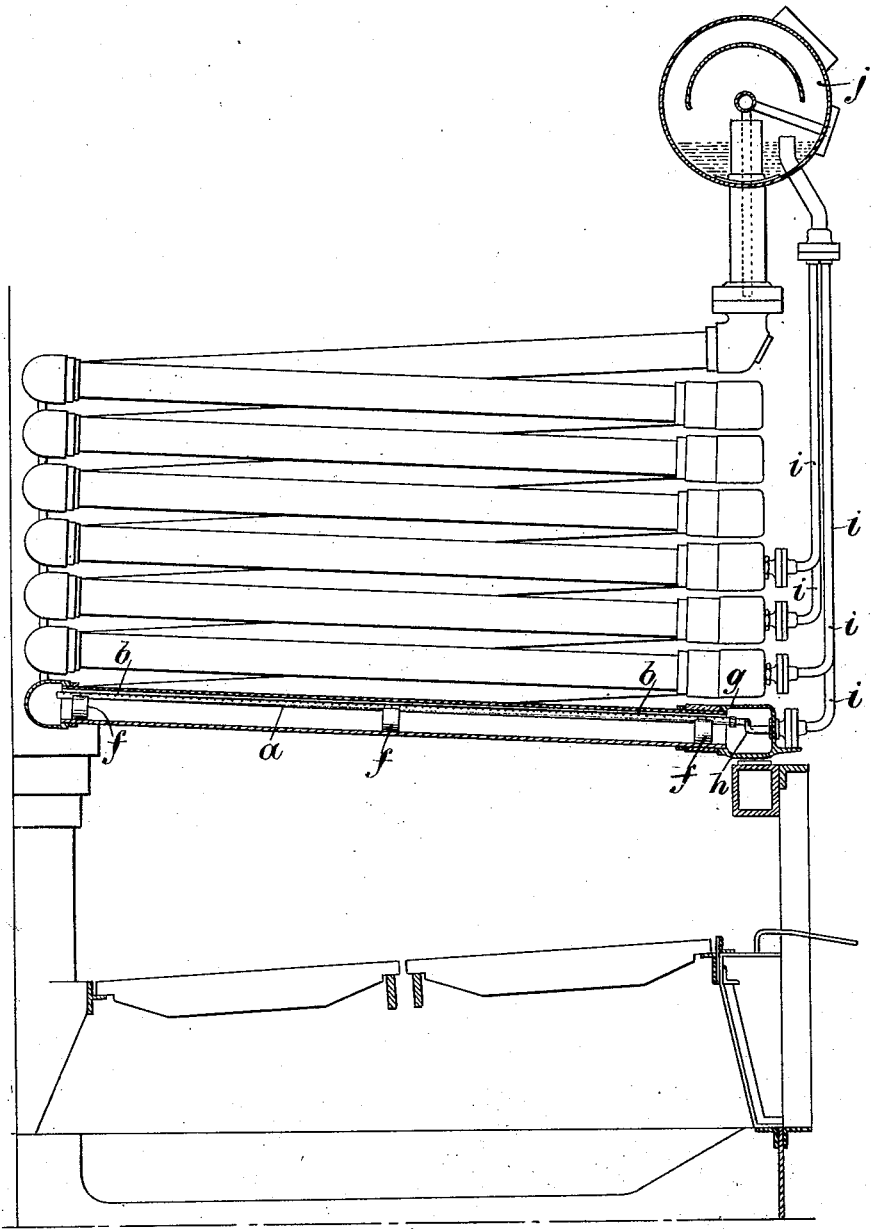

No. 755,217. PATENTED MAR. 22, 1904.
S. M. COCKBURN.
DEVICE FOR REMOVING STEAM FROM THE HEATING SURFACES
OF STEAM GENERATORS.
APPLICATION FILED SEPT. 4, 1903.
NO MODEL. 3 SHEETS—SHEET 1.

No. 755,217. PATENTED MAR. 22, 1904.
S. M. COCKBURN.
DEVICE FOR REMOVING STEAM FROM THE HEATING SURFACES
OF STEAM GENERATORS.
APPLICATION FILED SEPT. 4, 1903.
NO MODEL. 3 SHEETS—SHEET 2.
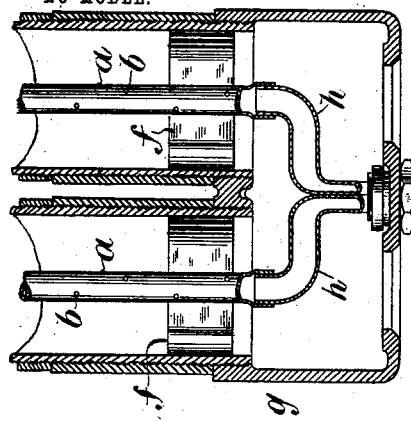
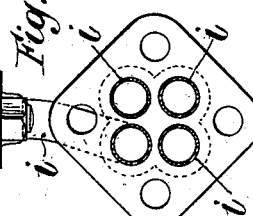
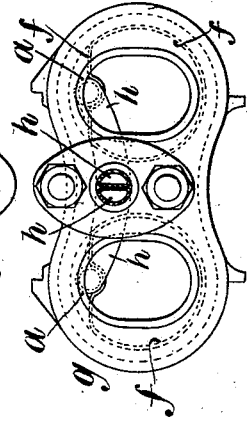
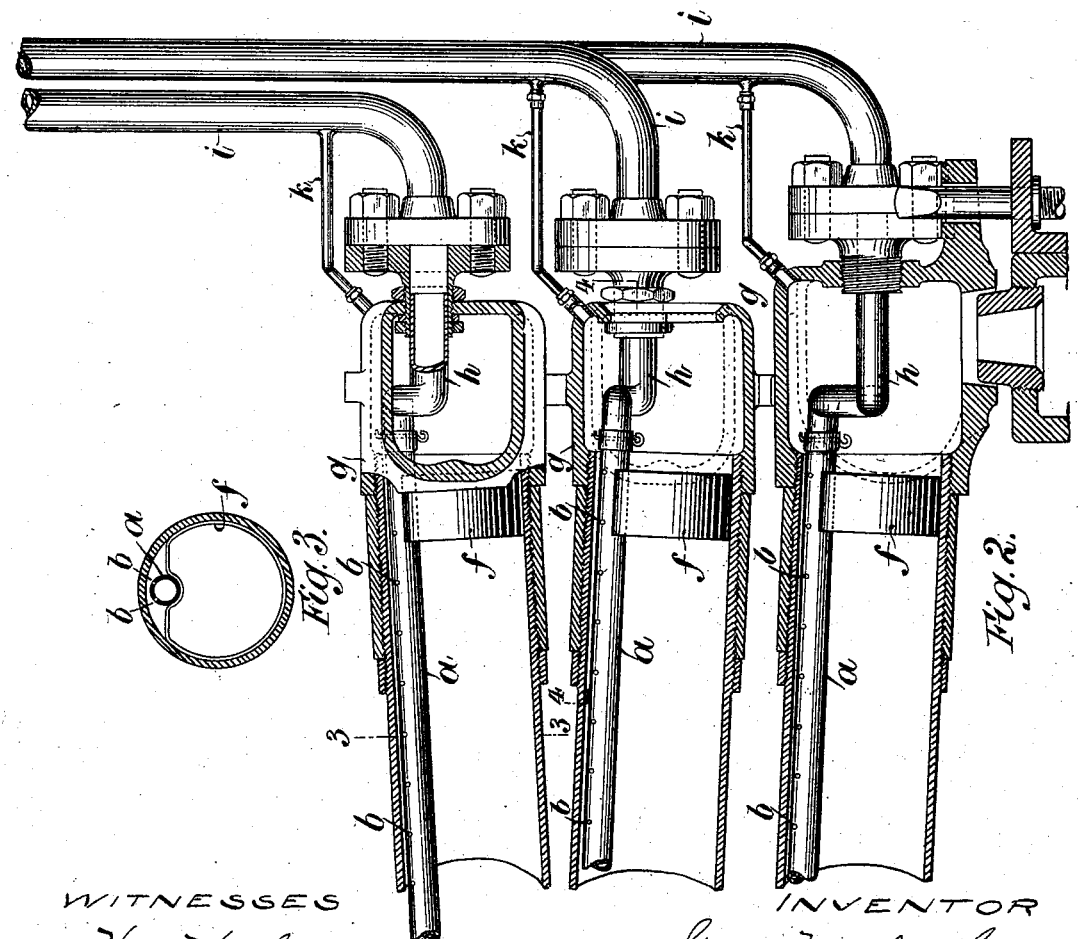

No. 755,217. PATENTED MAR. 22, 1904.
S. M. COCKBURN.
DEVICE FOR REMOVING STEAM FROM THE HEATING SURFACES
OF STEAM GENERATORS.
APPLICATION FILED SEPT. 4, 1903.
NO MODEL. 3 SHEETS—SHEET 3.
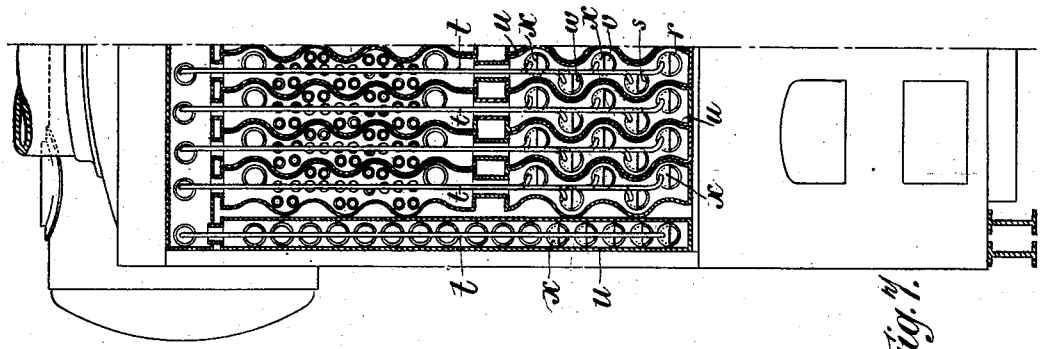
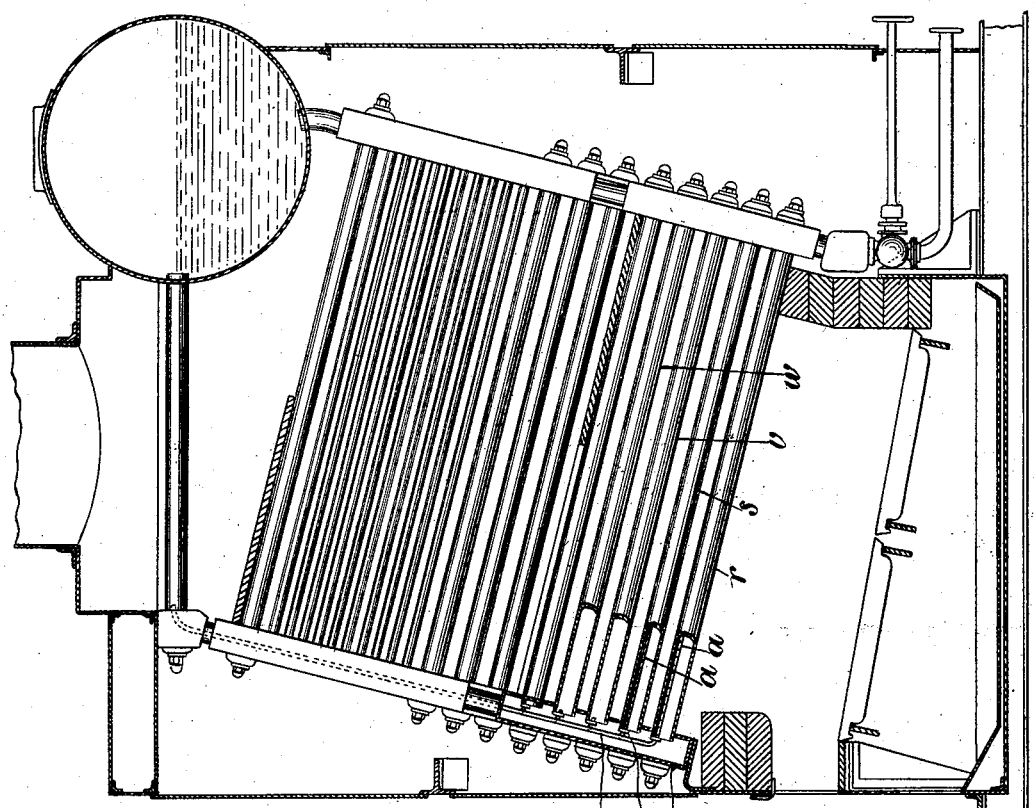
WITNESSES
H. M. Kuhane
John A. Percival
INVENTOR
Sidney Manthorp Cockburn
BY Richards & Co
ATTORNEYS
THE NORRIS PETERS CO., PHOTO-LITHO., WASHINGTON, D. C.

No. 755,217. Patented March 22, 1904.

UNITED STATES PATENT OFFICE.

SIDNEY MANTHORP COCKBURN, OF LONDON, ENGLAND.

DEVICE FOR REMOVING STEAM FROM THE HEATING-SURFACES OF STEAM-GENERATORS.

SPECIFICATION forming part of Letters Patent No. 755,217, dated March 22, 1904.

Application filed September 4, 1903. Serial No. 171,939. (No model.)

*To all whom it may concern:*

Be it known that I, SIDNEY MANTHORP COCKBURN, A. M. Inst., C. E., of 72 Bishopsgate Street Within, London, England, have invented a certain new and useful Improved Device for Removing Steam from the Heating-Surfaces of Steam-Generators; and I do hereby declare the following to be a full, clear, and exact description of the invention, such as will enable others skilled in the art to which it appertains to make and use the same.

This invention relates to a contrivance which is adapted to remove bubbles of steam from the heating-surfaces of steam-generators almost immediately on their formation and provide a means whereby they may be conducted to a steam drum or dome with comparatively small disturbance of the water in the boiler.

The object is to enable steam which has received from the heating-surface all the heat it requires to readily give place to water for which heat is wanted to convert it into steam with the twofold purpose—first, that of causing the heating-surface to transmit heat with greater rapidity, and thus increase the power of a boiler, and, second, to avoid the injury which so frequently arises from the undue heating of the surface by a lengthened contact with steam on the one and heated products of combustion on the other side.

The advantages due to the use of my device are derived from the fact that while bubbles of steam progress very sluggishly if they have to make their way by successive displacements of a mass of water which surrounds them the steam itself will be able to flow with exceeding rapidity along a continuous channel devoid of water. Thus if a pipe be provided into which the steam can freely enter immediately on generation on the heating-surface such pipe will most efficiently serve the purpose of transmitting the steam by the adoption of a section quite small relatively to the section which would be occupied by the steam if it had to thread its way through the mass of water unconducted. Moreover, this small section, which in my device is provided for the transit of the steam, is isolated from the heating-surface by intervening water, and thus the heating-surface is rendered permanently effective for heat-transmission and free from danger of overheating.

Figure 1 shows how the device is applied to extract the steam which is generated in the lower tubes of a Belleville boiler and convey it to the steam-drum by a specially-provided pipe without requiring it to traverse a zigzag path through all the tubes of a boiler element, as in Belleville boilers now in use. Figs. 2, 3, 4, and 5 show the details of this construction on an enlarged scale, Fig. 2 being a part-sectional elevation, and Fig. 3 a section along 3 3 in Fig. 2. Fig. 4 is a section along 4 4 in Fig. 2, and Fig. 5 a front elevation of one of the junctions. Figs. 6 and 7 show the application to a Babcock-Wilcox boiler.

In the Belleville boiler each of the lower tubes are shown to contain a steam-extracting pipe $a$, which is perforated with small holes $b\ b$ in its upper surface and by means of carriers $f\ f$ held in close proximity with the upper internal surface of the boiler-tube. At the junction-box $g$ of two Belleville tubes the perforated pipes $a\ a$ are fitted with bent portions $h\ h$, of which one end is made semicircular in section in order that the two together may fit into a socket which is connected to the end of the ascension-pipe $i$, whereby steam which enters the perforated pipe $a$ is conducted directly to the steam-drum $j$.

In Fig. 2 supernumerary small pipes $k\ k$ are shown. These are not essential, but they serve for the escape of steam from the junction-boxes and allow them to remain permanently full of water. They also by providing an early admission of steam to the pipes $i$ expedite the starting of the withdrawal of the steam through the perforations in the pipe $a$. For the sake of clearness the supernumerary small pipes $k\ k$ are omitted from Fig. 1.

The most efficient proportions of the pipes $a\ h\ i$ and the perforations $b$ will be those which are just capable of admitting and transmitting the steam alone without any water.

The situation of the perforations in $a$ are such that steam will have precedence of entry; but if the rate of generation is not sufficient to provide all the steam which under a difference of pressure due to the head of water outside the pipe $a$ over that inside can pass through the perforations $b$ $b$ then water will follow or accompany the entering steam and by occupying a portion of $a$ and the connected ascension-pipe $i$ lessen the head. In this way an automatic adjustment of the head will take place, and in general a quantity of water will be conveyed with the steam up the ascension-pipe $i$ to the steam-drum $j$. Such water will be returned to the bottom tubes by the down-comer-pipes in the usual manner. On account of the pipes $i$ being more or less entirely occupied by steam there will be considerable suction into the pipes $a$ $a$, enabling not only those tubes which slope upward to the junction-boxes to be kept free from steam, but also the alternate tubes which slope downward to the same junction-boxes. The device will enable the tubes of a marine Belleville boiler to be maintained free from steam even when the boiler is much inclined from the normal position. The almost immediate removal of the steam from the heating-surface will not only prevent that surface from becoming overheated by enabling that surface to be permanently in contact with water, but it will also cause the rate of flow of heat to be largely augmented and increase the power derivable from the boiler.

Figs. 6 and 7 exhibit the application of the steam-extracting device to a Babcock-Wilcox boiler. In this case perforated tubes $a$ are shown extending along the length of the two lower tubes $r$ and $s$, both leading into the same ascension-pipe $t$, which is placed within the header $u$. From the two next higher tubes $v$ and $w$ the perforated tube is omitted and a short branch merely from the ascension-pipe $t$ is inserted into the upper ends of those tubes, a semicircular disk $x$ being added to each of those branches to stop back the steam which is generated in those tubes and direct it into the ascension-pipe. Similar short branches may be added for each of the tubes above; but as the rate of generation of steam in those upper tubes will not be rapid they are omitted. It may be sufficient for this boiler to dispense entirely with the perforated tube $a$ and to fit merely the short branch and segmental disk to the end of some of the lower tubes of a header to conduct the steam direct to the steam-space.

I claim—

1. In steam-generators having a plurality of heating-surfaces so situated that the steam generated thereon tends to pass in contact with them in rising to the steam-space, a device for extracting the steam by simple gravity action consisting of pipes separated from the source of heat leading to the steam-space from the neighborhood of the heating-surfaces and orifices in such pipes placed in close proximity to the heating-surface on which the steam is generated.

2. In steam-generators having a plurality of heating-surfaces so situated that the steam generated thereon tends to pass in contact with them in rising to the steam-space, a device for extracting the steam by simple gravity action consisting of pipes separated from the source of heat leading to the steam-space from the neighborhood of the heating-surfaces and orifices in such pipes placed in close proximity to the upper internal surfaces of nearly horizontal tubes which are internally supplied with water and exposed to heat on the outside.

3. In steam-generators, a combination of a nearly horizontal steam-generating tube having the source of heat outside, a steam-extracting pipe connected thereto, a steam-space, an ascension-pipe leading to the steam-space and a branch connection between the extracting and ascension pipes.

4. In steam-generators, a combination of a nearly horizontal steam-generating tube having the source of heat outside, a perforated steam-extracting pipe therein, such pipe being sustained with its perforations close to the upper internal surface of the steam-generating tube, a steam-space, an ascension-pipe leading to the steam-space and a branch connection between the extracting and ascension pipes.

In testimony whereof I have hereunto set my hand in the presence of two subscribing witnesses.

SIDNEY MANTHORP COCKBURN.

Witnesses:
THOMAS ALFRED HEARSON,
T. J. OSMAN.